United States Patent
Yoshida et al.

(10) Patent No.: US 7,975,088 B2
(45) Date of Patent: Jul. 5, 2011

(54) CONNECTION DETECTING INFORMATION PROCESSING APPARATUS

(75) Inventors: Kikutada Yoshida, Tokyo (JP); Tatsuya Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 858 days.

(21) Appl. No.: 11/931,263

(22) Filed: Oct. 31, 2007

(65) Prior Publication Data

US 2008/0152023 A1 Jun. 26, 2008

(30) Foreign Application Priority Data

Dec. 20, 2006 (JP) .................................. 2006-343610

(51) Int. Cl.
*H05K 7/10* (2006.01)
(52) U.S. Cl. ........................................ 710/302; 710/304
(58) Field of Classification Search .................. 710/302, 710/301, 304, 305, 311, 313, 316
See application file for complete search history.

(56) References Cited

U.S. PATENT DOCUMENTS

| | | | | |
|---|---|---|---|---|
| 5,758,102 A | * | 5/1998 | Carey et al. | 710/302 |
| 5,875,308 A | * | 2/1999 | Egan et al. | 710/302 |
| 5,948,090 A | * | 9/1999 | Heinrich et al. | 710/302 |
| 5,996,035 A | * | 11/1999 | Allen et al. | 710/302 |
| 6,125,417 A | * | 9/2000 | Bailis et al. | 710/302 |
| 6,134,621 A | * | 10/2000 | Kelley et al. | 710/311 |
| 6,286,066 B1 | * | 9/2001 | Hayes et al. | 710/302 |
| 6,363,452 B1 | * | 3/2002 | Lach | 710/316 |
| 6,434,652 B1 | * | 8/2002 | Bailis et al. | 710/302 |
| 6,564,279 B1 | * | 5/2003 | Neil et al. | 710/302 |
| 6,715,019 B1 | * | 3/2004 | Benson et al. | 710/305 |
| 6,772,263 B1 | * | 8/2004 | Arramreddy | 710/302 |
| 7,076,591 B2 | * | 7/2006 | Arramreddy | 710/302 |
| 7,523,241 B2 | * | 4/2009 | Konishi | 710/302 |
| 7,565,473 B2 | * | 7/2009 | Tabira et al. | 710/302 |
| 7,755,653 B2 | * | 7/2010 | Takamori | 345/699 |
| 2007/0123104 A1 | * | 5/2007 | Hisatomi | 439/607 |
| 2008/0074555 A1 | * | 3/2008 | Chen et al. | 348/720 |

FOREIGN PATENT DOCUMENTS

| | | |
|---|---|---|
| JP | 5-30930 | 4/1993 |
| JP | 2004-280808 | 10/2004 |
| JP | 2006-121705 | 5/2006 |
| JP | 2006-319502 | 11/2006 |

OTHER PUBLICATIONS

Hitachi et al. High-Definition Multimedia Interface. Specification. Version 1.3. Jun. 22, 2006.*
Chrontel. CH7322B CEC. Data Sheet. Revision 1.2. Jun. 29, 2009.*
PCI Special Interest Group. PCi Standard Hot-Plug Controller and Subsystem Specification. Revision 1.0. Jun. 20, 2001.*
Intersil. HIP1011 PCI Hot Plug Controller. Application Note. Mar. 2000.*

* cited by examiner

*Primary Examiner* — Matthew D Spittle
(74) *Attorney, Agent, or Firm* — Oblon, Spivak, McClelland, Maier & Neustadt, L.L.P.

(57) ABSTRACT

An information processing apparatus configured to connect an external device in conformity with a predetermined interface specification, includes: a control LSI configured to control signal output to an external device effectively connected; and a CPU configured to control the operation within the apparatus including the control LSI as a whole; wherein the CPU includes an interface circuit connected to a detecting unit configured to detect the validity of connection to an external device, a control LSI control unit configured to control reset of the control LSI, and release of the reset state of the control LSI according to the detection result of the detecting unit, and the control LSI.

9 Claims, 10 Drawing Sheets

CONNECTION DETECTING INFORMATION PROCESSING APPARATUS

CROSS REFERENCES TO RELATED APPLICATIONS

The present invention contains subject matter related to Japanese Patent Application JP 2006-343610 filed in the Japanese Patent Office on Dec. 20, 2006, the entire contents of which are incorporated herein by reference.

BACKGROUND OF THE INVENTION

1. Field of the Invention

The present invention relates to an information processing apparatus for connecting an external device in conformity with a predetermined interface specification, and particularly relates to an information processing apparatus for connecting an external device in conformity with HDMI (High Definition Multimedia Interface).

More specifically, the present invention relates to an information processing apparatus which operates as an HDMI source, detects the validity of connection to an external device serving as an HDMI sink, and in the event of valid connection, acquires device information to output a suitable video signal, and particularly relates to an information processing apparatus for controlling a power saving operation according to the validity of connection to an HDMI sink.

2. Description of the Related Art

The HDMI (High Definition Multimedia Interface) is an interface standard principally designed for digital video and audio input/output for a household appliance or AV equipment (e.g., see High-Definition Multimedia Interface Standard Version 1.3), and specifically, an arrangement is made wherein the DVI (Digital Visual Interface) which is a digital interface employed for connection between a personal computer and a display is further advanced so as to send/receive video signals, audio signals, and bidirectional control signals with a single cable, thereby simplifying cable connections. Also, with an optional arrangement, a control signal can be transmitted in bidirectionally, and multiple AV devices can be controlled with a single remote control by relaying between the devices.

With HDMI, TMDS (Transition Minimized Differential Signaling) which is a digital transmission system for a display video signal also employed for the DVI is applied to a physical layer, whereby high speed digital data transmission can be realized. TMDS is a technique for differentially transmitting digital data, and is configured of a link made up of four channels in total each of which is assigned to the transmission of each of three types of video signals of R (Red), G (Green), and B (Blue), and a reference clock signal, respectively. Each of the video signals transmits 10-bit data per one clock cycle by serially converting a 10-bit parallel signal. For example, in the event of employing a 500-MHz clock, video data of 5G bits per one second can be transmitted (the effective transmission rate of the HDMI version 1.3 is 250 Mbps through 3.4 Gbps).

For example, a video signal processing apparatus has been proposed, which includes a specification information acquiring unit for acquiring specification information indicating the specification of a monitor connected to a digital video output terminal, a selection operation accepting unit for accepting the selection operation of a user who selects the type of the analog video output terminal of the monitor connected to an analog video output terminal, a setting operation accepting unit for accepting the setting operation of a user who prioritizes one of the specification information acquired by the specification information acquiring unit and the selection operation of a user accepted by the selection operation accepting unit, and a determining unit for determining the resolution of the video signal to be output based on the specification information acquired by the specification information acquiring unit, and the selection operation of a user accepted by the selection operation accepting unit, and the setting operation of a user accepted by the setting operation accepting unit (see Japanese Unexamined Patent Application Publication No. 2006-319502).

Figure 8:
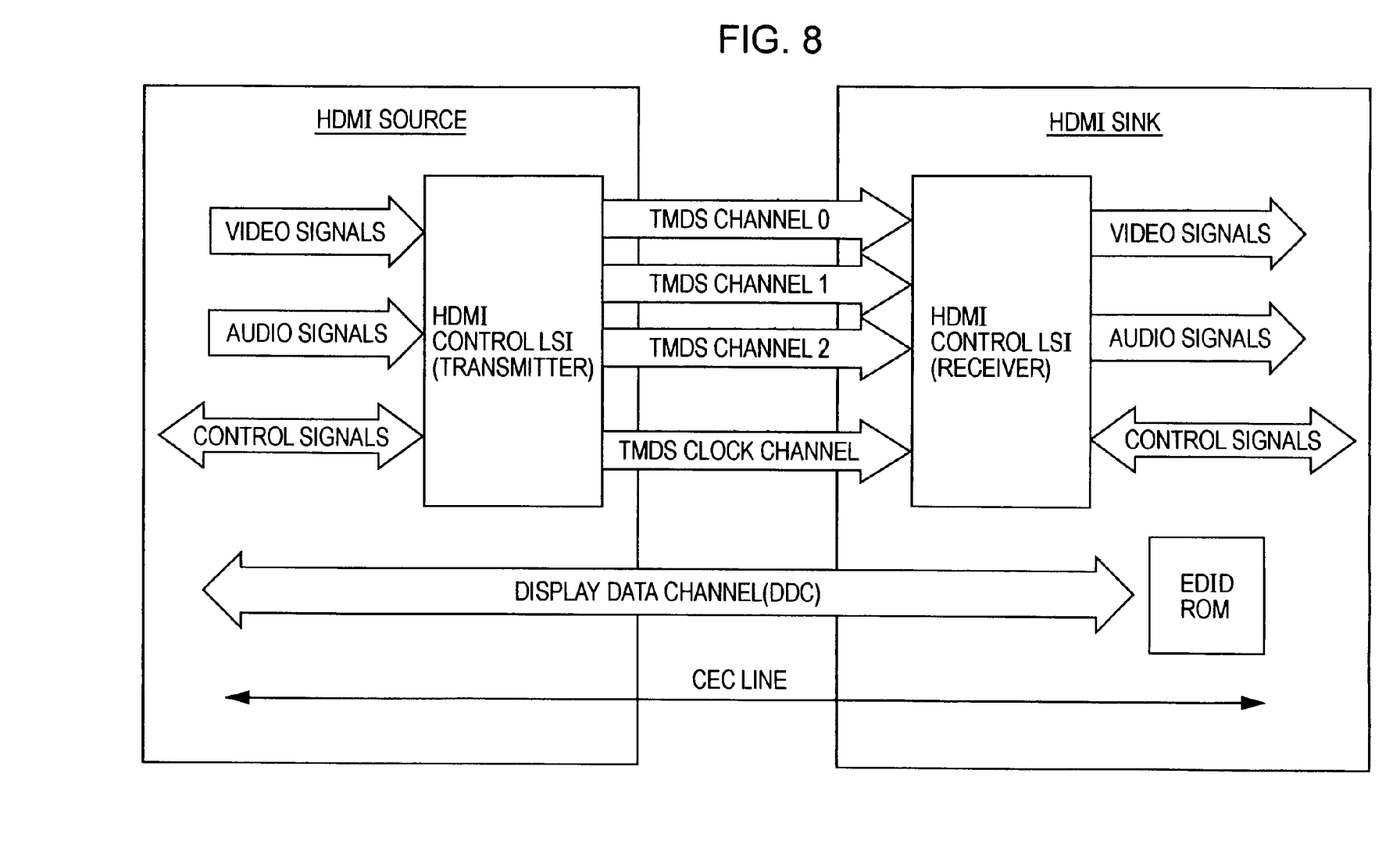
FIG. 8 is a diagram schematically illustrating the configuration of an HDMI communication system in which an HDMI source is connected to an HDMI sink over HDMI cables.
Figure 9:
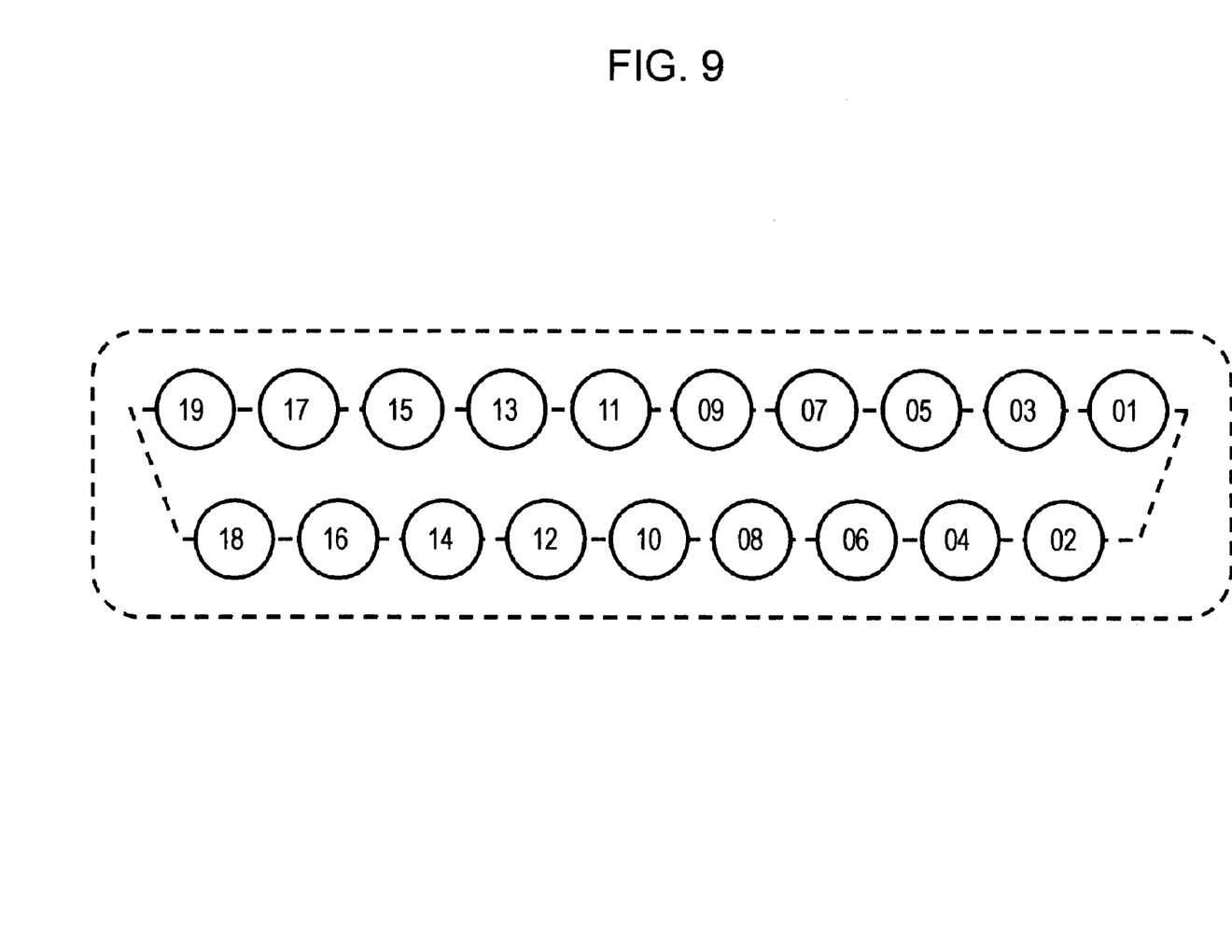
FIG. 9 is a diagram illustrating the pin array of an HDMI interface connector.

FIG. 8 schematically illustrates the configuration of an HDMI communication system in which an HDMI source is connected to an HDMI sink over HDMI cables. Also, FIG. 9 illustrates the pin array of an HDMI interface connector (type A in this case) (see Table 1). An HDMI source for supplying a video signal, and an HDMI sink for playing and outputting a video signal are mutually connected via an HDMI interface. The HDMI source reads out resolution information called as EDID (Extended Display Identification Data) from EDID ROM within the HDMI sink, and converts this into resolution compatible with the sink side, and outputs the converted video signal.

TABLE 1

| PIN NUMBER | SIGNAL | PIN NUMBER | SIGNAL |
|---|---|---|---|
| 1 | TMDS DATA 2+ | 2 | TMDS DATA 2 SHIELD |
| 3 | TMDS DATA 2− | 4 | TMDS DATA 1+ |
| 5 | TMDS DATA 1 SHIELD | 6 | TMDS DATA 1− |
| 7 | TMDS DATA 0+ | 8 | TMDS DATA 0 SHIELD |
| 9 | TMDS DATA 0− | 10 | TMDS CLOCK+ |
| 11 | TMDS CLOCK SHIELD | 12 | TMDS CLOCK− |
| 13 | CEC | 14 | RESERVED (N.C. ON DEVICE) |
| 15 | SCL | 16 | SDA |
| 17 | DDC/CEC GROUND | 18 | +5 V POWER |
| 19 | HOT PLUG DETECT | | |

For example, a camcorder including an HDMI interface serving as an HDMI source supplies the video of a captured moving image or still image to an HDMI-capable television monitor, whereby the video can be output on the screen thereof.

SUMMARY OF THE INVENTION

Incidentally, with a battery-driven device such as a camcorder, reduction of power consumption becomes one of the important technical problems. It is needless to say that even with a device capable of employing commercial AC power supply, further reduction in power consumption is desired from the perspective of social ecology.

For example, with a camcorder serving as an HDMI sink, turning on the power of an HDMI control LSI only when an HDMI-capable television monitor or the like is externally connected, and turning off the power in the other cases to suppress unnecessary power consumption, is desirable.

Figure 10:
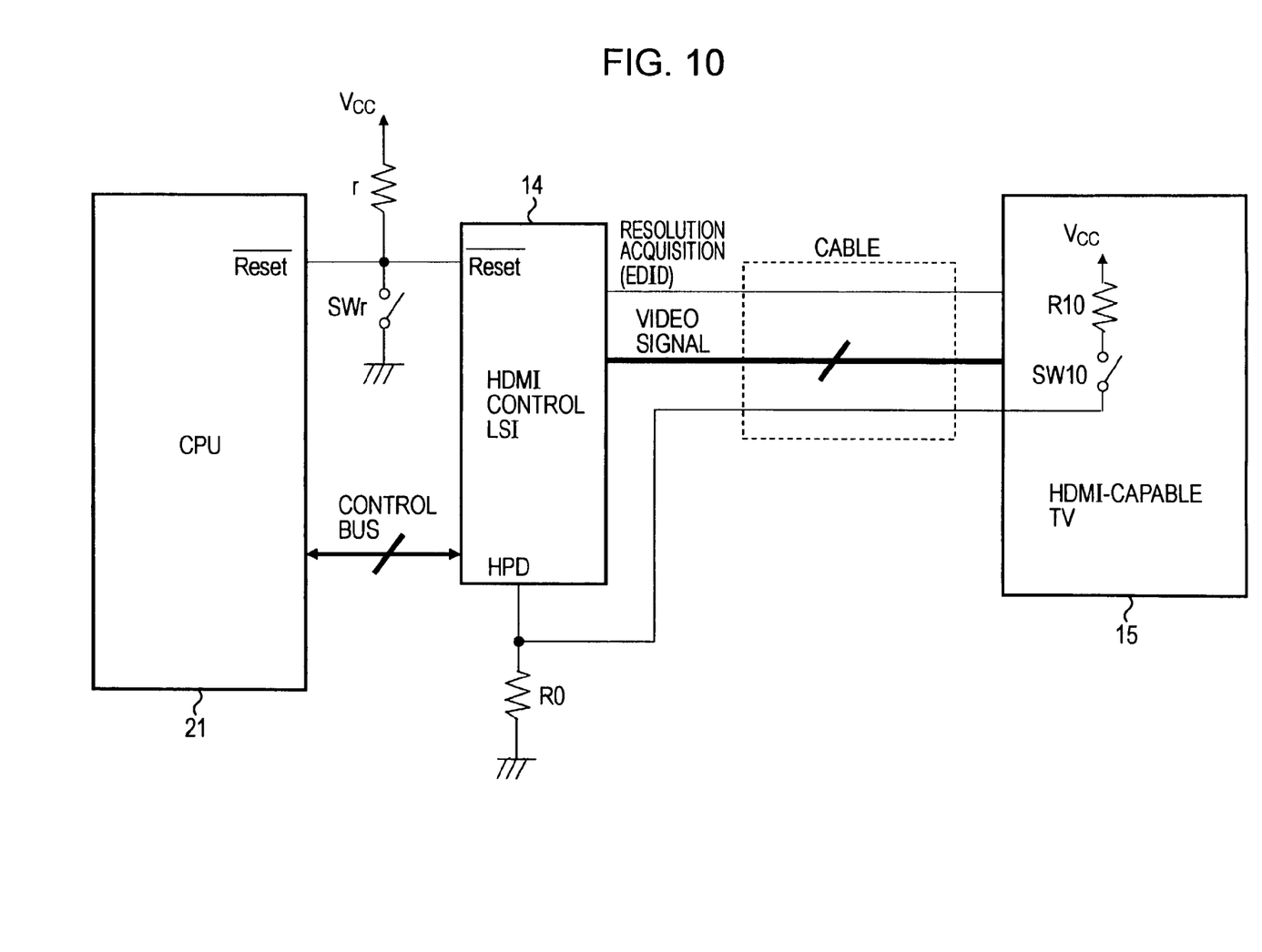
FIG. 10 is a diagram illustrating a situation in which a camcorder serving as an HDMI sink is connected to a television monitor serving as an HDMI source via an HDMI control LSI.

FIG. 10 schematically illustrates a situation in which a camcorder serving as an HDMI sink is connected to a television monitor serving as an HDMI source via an HDMI control LSI.

Whether or not a valid HDMI-capable television is connected can be determined based on an HPD signal pin. As shown in the drawing, at the television monitor side the HPD signal pin is connected to power voltage $V_{cc}$ via a pull-up resister R10. On the other hand, at the HDMI control LSI side the HPD signal pin is grounded via a pull-down resister R0, and when a television monitor is connected, a voltage level obtained by the power voltage $V_{cc}$ being subjected to partial pressure with R10 and R0 is input to the HPD signal pin, whereby connection can be detected (let us say that R0 is sufficiently greater than R10).

With the system configuration shown in FIG. 10, when power is turned on at the HDMI source side such as a camcorder, a reset switch SWr is turned off from on, and the CPU and HDMI control LSI, of which the reset states are released, operate. Subsequently, the HDMI control LSI becomes a power-on state constantly. Therefore, at the time of the recording operation or playback operation of a camcorder, with a period when a video signal is not output to an HDMI sink, such as when a television monitor is not specified as a playback output destination, or a valid HDMI sink is subsequently removed, or the like, the HDMI control LSI is only wasting power.

There has been recognized a need for an excellent information processing apparatus which can be suitably connected to an external device in conformity with the HDMI standard.

There has been recognized a further need for an excellent information processing apparatus which can operate as an HDMI sink, detect the validity of connection to an external device serving as an HDMI source, and in the event of valid connection, acquire device information to output as a suitable video signal.

There has been recognized a further need for an excellent information processing apparatus, whereby a power saving operation can be controlled according to the validity of connection to an HDMI source.

There has been recognized a further need for an excellent information processing apparatus, whereby a power saving operation can be realized by performing the power on/off operation of the HDMI control LSI according to the validity of connection to an HDMI source.

According to an embodiment of the present invention, an information processing apparatus, configured to connect an external device in conformity with a predetermined interface specification, includes: a control LSI configured to control signal output to an external device effectively connected; and a CPU configured to control the operation within the apparatus including the control LSI as a whole; wherein the CPU includes an interface circuit connected to a detecting unit configured to detect the validity of connection to an external device, a control LSI control unit configured to control reset of the control LSI, and release of the reset state of the control LSI according to the detection result of the detecting unit, and the control LSI.

A predetermined interface specification as stated here is, for example, the HDMI (High Definition Multimedia Interface) in which determination has been made regarding the output of a video signal. The HDMI is an interface standard designed for digital video and audio input/output for a household appliance or AV equipment, which has advanced the DVI, and also employs the TMDS to be applied to a physical layer. With such a predetermined interface specification, an arrangement may be made such that the external device provides device information, and outputs a hot plug detection signal.

In the event that an HDMI source which is the output source of a video signal is a battery-driven device such as a camcorder, reduction in power consumption is an important technical problem. Continuing to turn on the power of the HDMI control LSI under an operation mode in which no video signal is output to an HDMI sink, for example, such that when an HDMI sink such as a television monitor is not connected, or during a period when a recording operation is being performed, results in wasting of power, which is undesirable.

With the information processing apparatus according to an embodiment of the present invention, the CPU configured to control the operation within the apparatus as a whole includes an interface circuit connected to a detecting unit configured to detect the validity of connection to an external device, a control LSI control unit configured to control reset of the control LSI, and release of the reset state of the control LSI according to the detection result of the detection unit, and the control LSI. Accordingly, the control LSI control unit performs processing so as to reset the control LSI in response to the detecting unit detecting no valid external device being connected, and so as to release the reset state of the control LSI in response to the detecting unit detecting a valid external device being connected, whereby reduction in power consumption can be realized by resetting the control LSI to stop the operation thereof as appropriate. Also, in the rest state of the control LSI, reduction in power consumption of the CPU may be realized by stopping the operation of the interface circuit.

Now, in the event of monitoring the hot plug detection signal at the CPU side, there is a need to monitor a signal pin in a short cycle, which leads to problems such that power consumption increases by the processing load of the CPU increasing, or it is difficult to follow the noise of the hot plug detection signal along with the instantaneous switching operation of an HDMI sink.

Now, an arrangement may be made wherein the control LSI and the detecting unit share the hot plug detection signal output from the external device, and also the control LSI activates a processing operation for reading device information from the external device in response to the hot plug detection signal.

The control LSI can sufficiently follow the switching operation of an HDMI sink by employing an input switching device for example, and stores the newest device information read from the HDMI sink in an internal register. Subsequently, the CPU can acquire the newest device information in a sure manner by polling the register within the control LSI with a relatively long cycle. Accordingly, a video signal can be converted into the resolution with which the HDMI sink side being connected now is compatible, and this can be output.

Also, with the CPU, there in no need to monitor the hot plug signal constantly, thereby enabling an intermittent operation for alternately repeating a wake state and a sleep state in which the operation of at least a part of circuit modules is stopped.

According to an embodiment of the present invention, an excellent information processing apparatus can be provided, which operates as an HDMI sink, detects the validity of connection to an external device serving as an HDMI source, and in the event of valid connection, acquires device information to output an appropriate video signal.

Also, according to an embodiment of the present invention, an excellent information processing apparatus can be provided, whereby a power saving operation can be realized by performing the power on/off operation of the HDMI control LSI in accordance with the validity of connection to an HDMI source.

According to an embodiment of the present invention, the power consumption of operation of the CPU when connecting no valid HDMI source such as an HDMI-capable television monitor can be reduced. Like a camcorder, in the event of taking a photograph outdoors, a television monitor is not connected, and accordingly, photography time can be lengthened more by turning off the power of an unemployed circuit block.

The further features and advantages of the present invention will be apparent with more detailed description based on later-described embodiments of the present invention, and appended drawings.

DESCRIPTION OF THE PREFERRED EMBODIMENTS

Description will be made below in detail regarding embodiments of the present invention with reference to the drawings.

Figure 1:
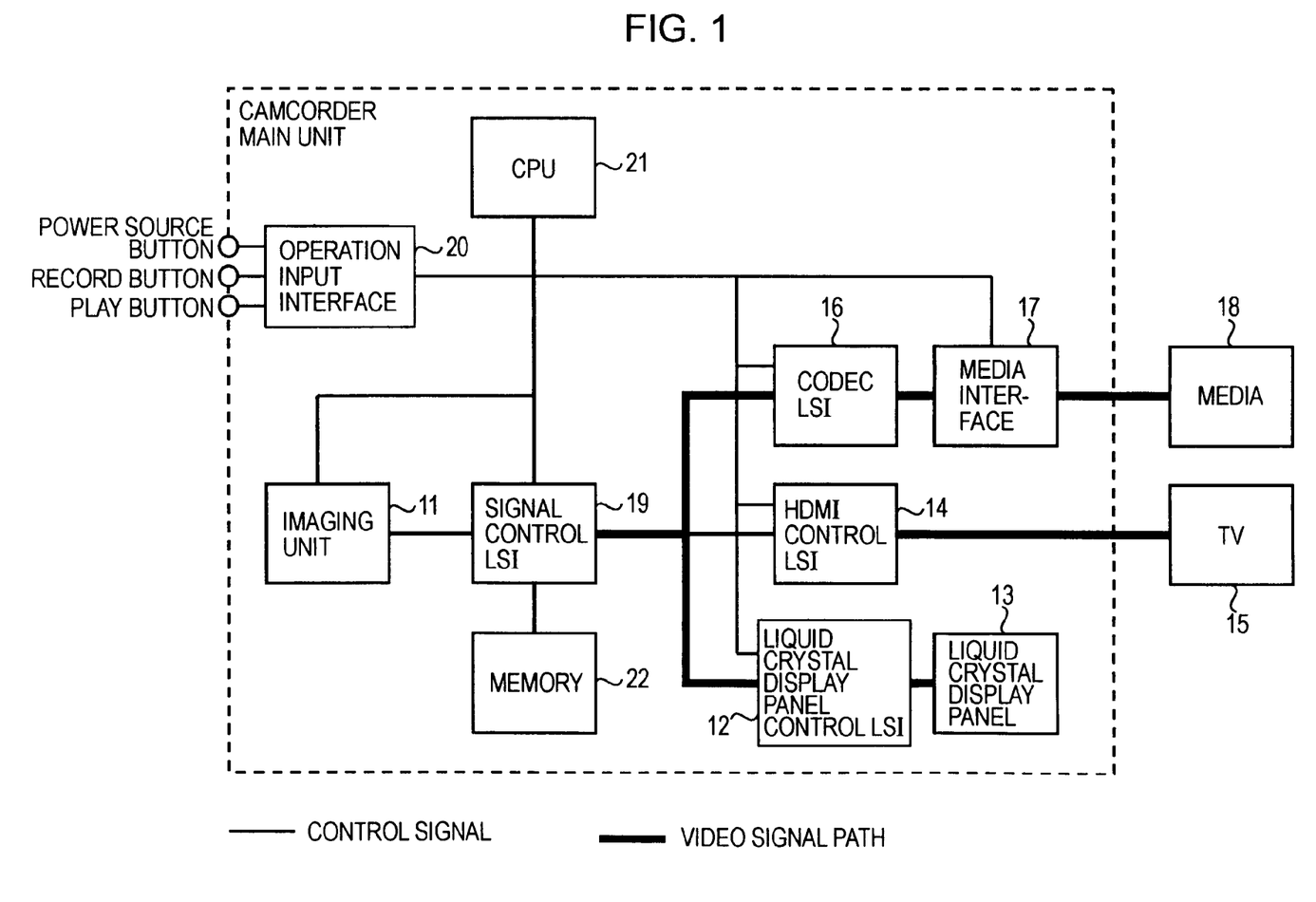
FIG. 1 is a diagram schematically illustrating the configuration of a camcorder including the HDMI interface.

FIG. 1 schematically illustrates the configuration of a camcorder including the HDMI interface. An imaging unit 11 is made up of a lens for capturing a subject image, a solid-state image capturing device such as a CCD (Charge Coupled Device) or CMOS (Complementary Mental-Oxide Semiconductor) which generate an electrical image signal by photoelectric conversion according to input light amount, an A/D converter for converting an image signal into a digital signal, and a demosaic processing unit (drawing is omitted) for calculating RGB signals from a digital image signal. This RGB image is, for example, displayed and output on a liquid crystal display panel 13 embedded in a device driven and controlled by a liquid crystal display panel control LSI 12. Alternatively, this RGB image is displayed and output on an HDMI-capable television monitor externally connected via an HDMI control LSI 114.

A codec LSI 16 performs encoding and decoding of a moving image stream or a still image captured by the imaging unit. Specifically, the image data input from the imaging unit 11 is encoded with a predetermined image format such as MPEG or JPEG, and stored in a built-in hard disk, or portable media 18 such as DVD or a memory card via a media interface 17. Also, the codec LSI 116 subjects the encoded image data read from the media 18 to decoding processing, displays and outputs this on the liquid crystal display panel 13 via the liquid crystal display panel control LSI 12, or externally outputs this on the HDMI-capable television monitor 15 via the HDMI control LSI 14.

A signal control LSI 19 performs distribution processing of the video signal input from the imaging unit 11, and the video signal output from the media 18.

A CPU (Central Processing Unit) 21 executes predetermined program code, and controls the operation of the relevant entire apparatus as a whole in accordance with the instruction from a user which is input via an operation input interface 20. An instruction is input from the operation input interface 20, such as turning on/off of the power, starting/stopping of recording of the video data captured by the imaging unit in the media 18, or starting/stopping of playback of the video data recorded in the media.

Next, description will be made regarding the operation of this camcorder. Upon a power source button provided at the operation input interface 20 being turned on, the CPU 21 is activated, which controls the imaging unit 11, signal control LSI 19, and liquid crystal display LSI 12 to output camera video on the liquid crystal display panel 13. Also, the signal control LSI 19 transmits an appropriate signal to the liquid crystal display panel 13 by using local memory 22. For example, in the event that the image size of the video signal from the imaging unit 11 is 1920×1080 pixels, and also the resolution of the liquid crystal display panel 13 is 640×480 pixels, the signal control LSI 19 generates a reduced video signal, and transmits this to the liquid crystal display panel control LSI 12. At this time, the HDMI control LSI 14 is kept in a power off state (i.e., reset state) by the CPU 21.

Also, upon a record button provided at the operation input interface 20 being pressed, the CPU 21 controls the signal control LSI 19, codec LSI 16, and media interface 17 to encode camera video in a predetermined image format such as MPEG, and to record this in the media 18. At this time, the signal control LSI 19 transmits a suitable video signal to the codec LSI 16 by using local memory 22. For example, in the event that the image size of the video signal from the imaging unit 11 is 1920×1080 pixels, and also the recording format of the media 18 is 720×480 pixels, the signal control LSI 19 generates and transmits a reduced video signal.

Also, upon a play button provided at the operation input interface 20 being pressed, the CPU 21 turns off the power of the imaging unit 11, controls the signal control LSI 19, codec LSI 16, media interface 17, HDMI control LSI 14, and liquid crystal display panel LSI 12 to decode the encoded video stream read from the recording media 18 at the codec LSI 16, and to transmit the video signal to the liquid crystal display panel control LSI 12.

At this time, it can be detected from the HPD (Hot Plug Detecting) signal pin included in the HDMI interface connector whether or not the television monitor 15 is connected to an HDMI terminal. Subsequently, when detecting the connection of the HDMI-capable television monitor 15, the CPU 21 turns on the power of the HDMI control LSI 14 (releases the reset state), and when acquiring EDID (resolution information) from the television monitor 15 via the HDMI control LSI 14, instructs this to the signal control LSI 19. The signal control LSI 19 outputs a video signal, which the television monitor 15 can display, based on the EDID. For example, in the event that the resolution of the video recorded in the media 18 is 1920×1080 pixels, but the EDID indicates that the television monitor 15 can display only 720×480 pixel size, the signal control LSI 19 generates a reduced video signal to transmit this to the HDMI control LSI 14.

With a battery-driven device such as a camcorder, reduction in power consumption is an important technical problem. It is needless to say that even with a device capable of employing commercial AC power supply, further reduction in power consumption is desired from the perspective of social ecology.

For example, with the system configuration of the camcorder shown in FIG. 1, turning on the power of the HDMI control LSI 14 only when a valid HDMI sink such as the HDMI-capable television monitor 15 is externally connected, and turning off the power in the other cases to suppress unnecessary power consumption, is desirable.

Figure 2:
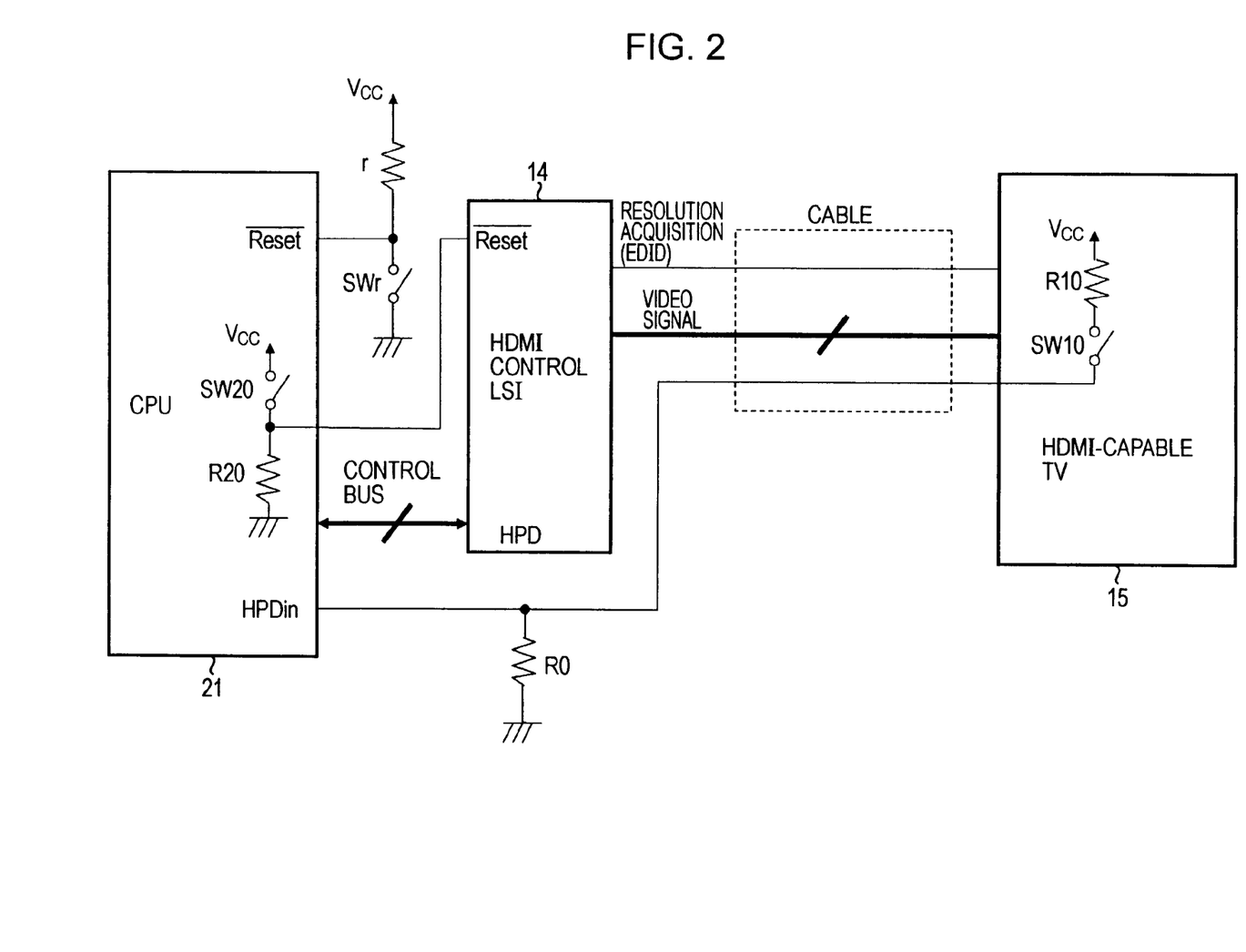
FIG. 2 is a diagram illustrating a configuration example in which the camcorder serving as an HDMI sink is connected to a television monitor 15 serving as an HDMI source via an HDMI control LSI 14.

FIG. 2 illustrates a situation in which the camcorder serving as an HDMI sink is connected with the television monitor 15 serving as an HDMI source via the HDMI control LSI 14. Under the connection mode shown in the drawing, the HDMI sink side performs the power on/off operation of the HDMI control LSI 14 in accordance with the validity of connection to the HDMI source, whereby a power saving operation can be realized.

It can be detected from the HPD signal pin whether or not the valid HDMI-capable television monitor 15 is connected. As shown in the drawing, at the television monitor 15 side the HPD signal pin is connected to the power voltage $V_{cc}$ via the pull-up resister R10. Under the connection mode shown in FIG. 10, at the HDMI source side the HPD signal pin is input to the HDMI control LSI 14, but under the connection mode shown in FIG. 2, the HPD signal pin is directly connected to the CPU 21. The HPD signal pin is grounded via the pull-down resister R0, but when the television monitor 15 is connected, the voltage level obtained by the power voltage $V_{cc}$ being subjected to partial pressure with R10 and R0 is input to the HPD signal pin. Accordingly, the CPU 21 can detect the validity of the connection thereof without the intervention of the HDMI control LSI 14 (let us say that R0 is sufficiently greater than R10).

Also, under the connection mode shown in FIG. 10, when power is turned on at the HDMI source side, the reset switch SWr is turned off from on, and the CPU 21 and HDMI control LSI 14, of which the reset state is released, operate. Subsequently, the HDMI control LSI 14 becomes a power-on state constantly. On the other hand, under the connection mode shown in FIG. 2, when power is turned on at the HDMI source side, the reset switch SWr is turned off from on, and only the CPU 21, of which the reset state is released, operates. Also, the CPU 21 includes a switch SW20 for resetting/reset-releasing the HDMI control LSI 14, whereby the power on/off of the HDMI control LSI 14 can be controlled with an arbitrary timing.

For example, when the power of the entire system is turned on, the reset SWr turns off from on, and the CPU 21 operates. Subsequently, the CPU 21 monitors in a constant cycle that the apparatus becomes a state (mode) in which video is output, and also the HPD signal level from the HDMI sink becomes high, and turns on the SW20 to make the HDMI control LSI 14 effective.

Figure 3A:
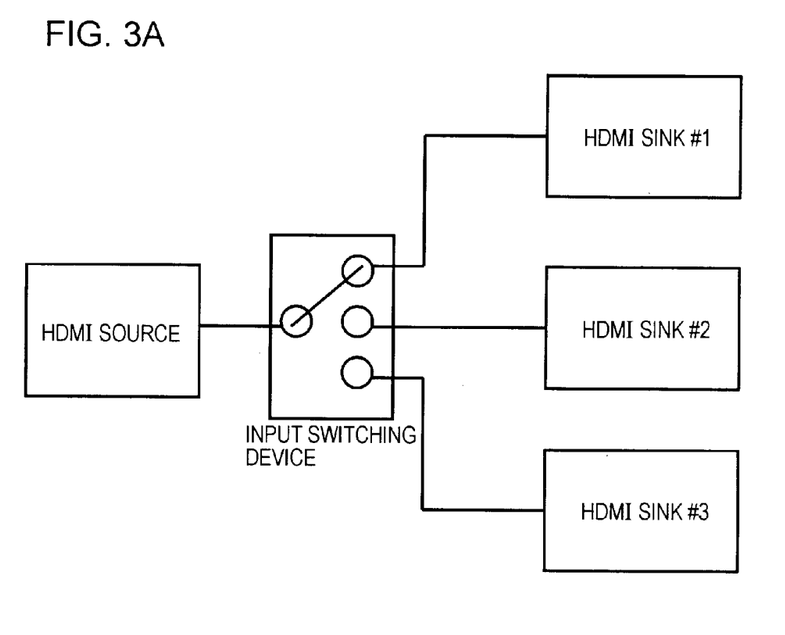
FIG. 3A is a diagram illustrating a situation in which multiple HDMI sinks are connected to a single HDMI source by employing an input switching device.
Figure 3B:
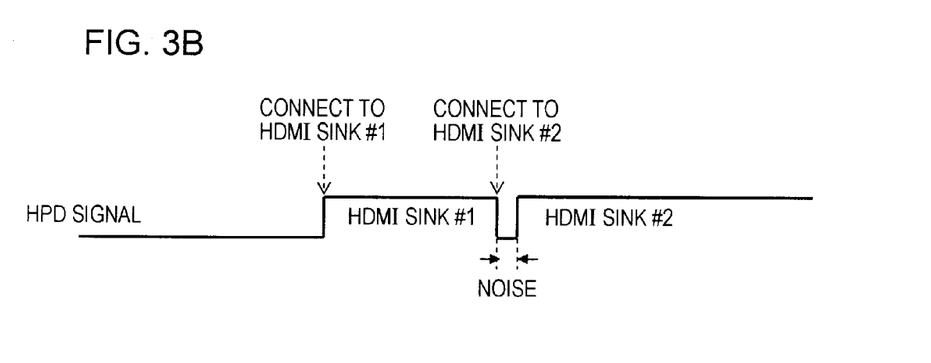
FIG. 3B is a diagram illustrating the state of an HPD signal in the event of performing connection switching to one of the multiple HDMI sinks at the input switching device.

However, the CPU 21 side needs to monitor the signal level of the HPD signal pin in a constant cycle through polling, resulting in a problem in that it is difficult to detect high-speed HPD signal noise. Therefore, in the event that an instantaneous interruption of power of a device at the HDMI sink side occurs, there is a need to restart the HDMI control LSI, but it is difficult to follow such high-speed HPD signal noise. Also, as shown in FIG. 3, an example of use is assumed wherein one of multiple HDMI sinks is switched so as to be connected to a single HDMI source by using an input switching device, but an instantaneous switching operation appears only as the noise of the HPD signal (see FIG. 3B), so unless the HDMI source can detect the noise, it is difficult to acquire the EDID from the HDMI sink which is a switching destination. As a result thereof, an output video signal cannot be changed to suitable resolution, which could lead to failure of the device.

In order to detect the variation of the HPD signal equivalent to noise, there is a need to shorten the cycle for polling the HPD signal pin, and to generate an interruption as to the CPU 21 at the edge of the signal, but in this case, the processing time of the CPU 21 increases, i.e., the power consumption of the CPU 21 increases.

Figure 4:
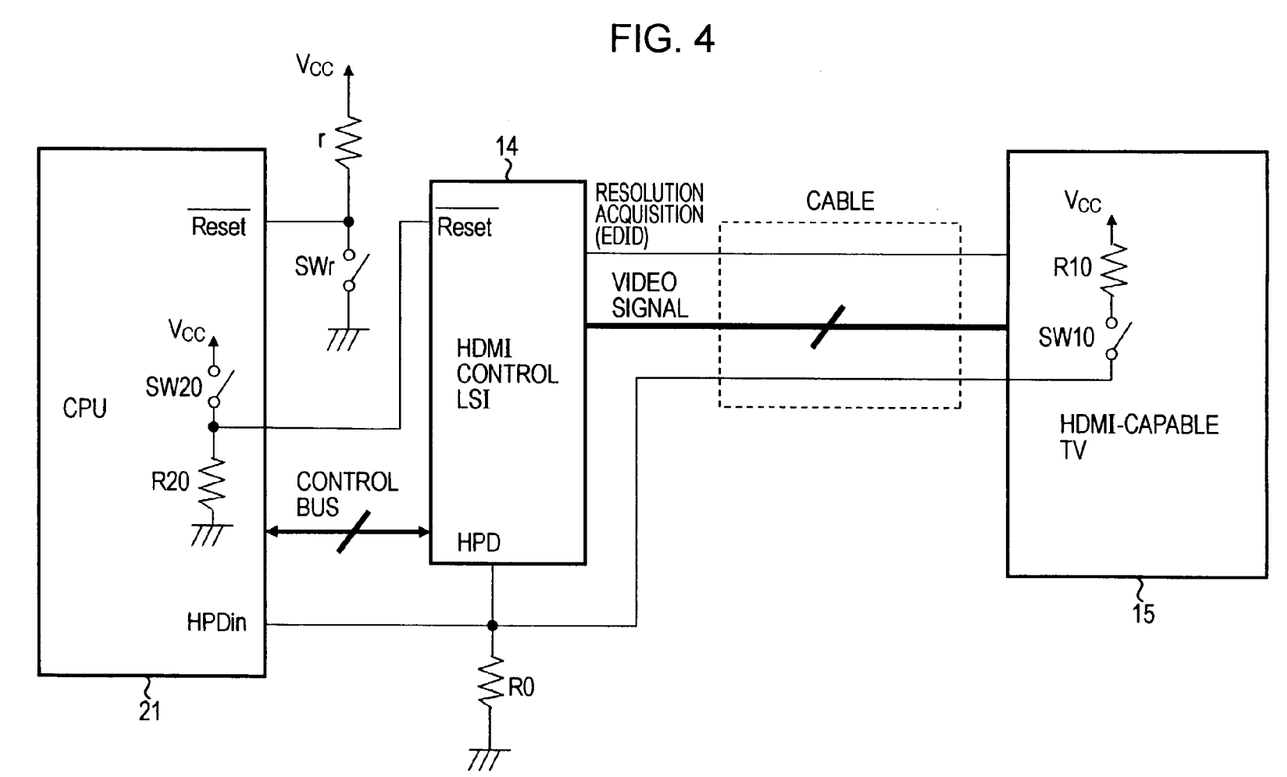
FIG. 4 is a diagram illustrating another configuration example in which the camcorder serving as an HDMI sink is connected to the television monitor 15 serving as an HDMI source via the HDMI control LSI 14.

FIG. 4 illustrates another configuration example wherein the camcorder serving as an HDMI sink is connected to the television monitor 15 serving as an HDMI source via the HDMI control LSI 14. Under the connection mode shown in this drawing as well, the HDMI sink side performs the power on/off operation of the HDMI control LSI 14 in accordance with the validity of connection to the HDMI source, whereby a power saving operation can be realized, but which is different from the connection mode shown in FIG. 2, and further, the instantaneous interruption of power and high speed input switching at the HDMI sink side can also be handled.

It can be detected from the HPD signal pin whether or not the valid HDMI-capable television monitor 15 is connected. As shown in the drawing, at the television monitor 15 side the HPD signal pin is connected to the power voltage $V_{cc}$ via the pull-up resister R10 (R0 is sufficiently greater than R10). With the example shown in FIG. 4, the HPD signal output from the HDMI sink side is shared between the CPU 21 and the HDMI control LSI 14.

Upon recognizing a great change, which is the connection of an HDMI sink, the CPU 12 releases the reset state of the HDMI control LSI 14. While the HDMI control LSI 14 is in a reset state, the power consumption thereof can be reduced.

Also, when the relevant HDMI source is not in an operation state of outputting a video signal, the CPU 21 changes the HDMI control LSI 14 into a reset state, whereby the power consumption can be reduced.

On the other hand, when the instantaneous interruption of power and high-speed input switching at the HDMI sink side (see FIG. 3) occur, the HPD signal noise occurring at that time can be detected by the HDMI control LSI 14. Subsequently, at each time thereof, the HDMI control LSI 14 acquires EDID from the HDMI sink side again, whereby the CPU 21 can perform the most appropriate video output constantly based on the newly acquired resolution information.

Thus, it is unnecessary for the CPU 21 to perform polling in a short cycle for monitoring the HPD signal, which enables an intermittent operation for alternately repeating a wake state and a sleep state, whereby the power consumption of the CPU 21 can be reduced. In a sleep state of the CPU 21, only the HDMI control LSI 14 performs monitoring of the HPD signal. The sleep state as stated here is a state in which the operation of at least a part of circuit modules is stopped, but is not restricted to the specific state of the CPU.

Figure 5:
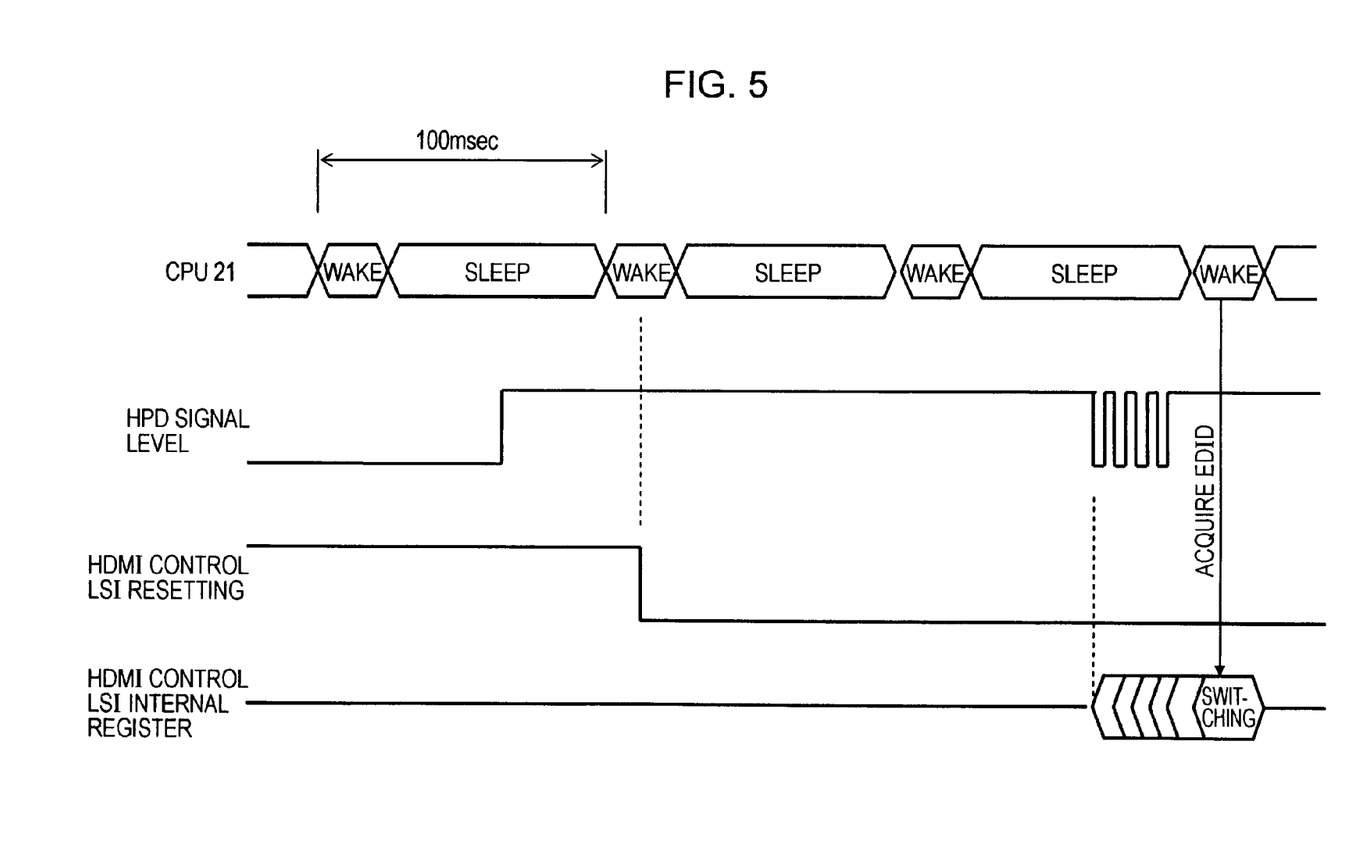
FIG. 5 is a diagram illustrating the operation timing chart of a CPU 21 and the HDMI control LSI 114 in the connection state shown in FIG. 4.

FIG. 5 illustrates the operation timing chart of the CPU 21 and the HDMI control LSI 14 under the connection mode shown in FIG. 4. With the example shown in the drawing, let us say that the CPU 21 performs an intermittent operation for alternately repeating a wake state and a sleep state with 100 ms as one cycle. Also, let us say that in an initial state, the HDMI control LSI 14 is reset. Now, as shown in FIG. 3, let us assume that multiple HDMI sinks are connected via an input switching device, and the connection to the HDMI source can be switched to one of the HDMI sinks.

Let us say that when the CPU 21 is in a sleep state, a valid HDMI sink such as the HDMI-capable television monitor 15 is connected, and the HPD signal is changed from a low level to a high level.

The CPU 21 can detect the HPD signal at the next wake timing by polling, and in response to this, releases the reset sate of the HDMI control LSI 14. Subsequently, the HDMI control LSI 14 reads out EDID from the EDID ROM within the HDMI sink, converts this into resolution with which the HDMI sink side is compatible, whereby a video signal can be output to the HDMI source.

Subsequently, while detecting that a valid HDMI sink is connected based on the HPD signal directly input to the CPU 21, the CPU 21 continues the reset-released state of the HDMI control LSI 14. Also, the CPU 21 continues to perform a cyclical intermittent operation for alternately repeating a wake state and a sleep state with an interval of 100 ms.

Now, let us say that while the CPU 21 has been in a sleep state, the switching of connection to the HDMI source has been performed at the input switching device several times. The HDMI control LSI 14 shares the HPD signal output from the HDMI sink, so in a reset-released state, can detect the connection switching of the HDMI sink based on the HPD signal, even if the CPU 21 is in a sleep state. Subsequently, the HDMI control LSI 14, which is configured so as to start a reading operation of EDID in response to the detection of the HPD signal, follows the connection switching of the HDMI sink, successively reads out EDID from the EDID ROM (not shown) within the HDMI sink, and writes this in the internal register.

Subsequently, upon waking from a sleep state, the CPU 21 performs polling on the register within the HDMI control LSI, whereby detection can be made that the connection switching of the HDMI sink has been performed, and also the newest EDID can be acquired. Accordingly, a video signal can be output in a state of being converted into resolution with which the HDMI sink side now being connected is compatible.

Also, though not shown in FIG. 5, in a wake state, when detecting that the HPD signal is a low level, i.e., a valid HDMI sink is not connected (removed), the CPU 21 turns off the switch SW20, changes the HDMI control LSI 14 into a reset state, whereby the power consumption can be reduced.

Thus, according to the present embodiment, the CPU 21 follows the connection switching of the HDMI sink, so there is no need to perform polling on the signal level of the HPD signal pin in a short cycle, and accordingly, processing load does not increase. Also, the CPU 21 does not need to wake only for the sake of monitoring the HDMI sink, and makes the transition to a sleep state as appropriate, whereby reduction in power consumption can be realized.

Figure 6:
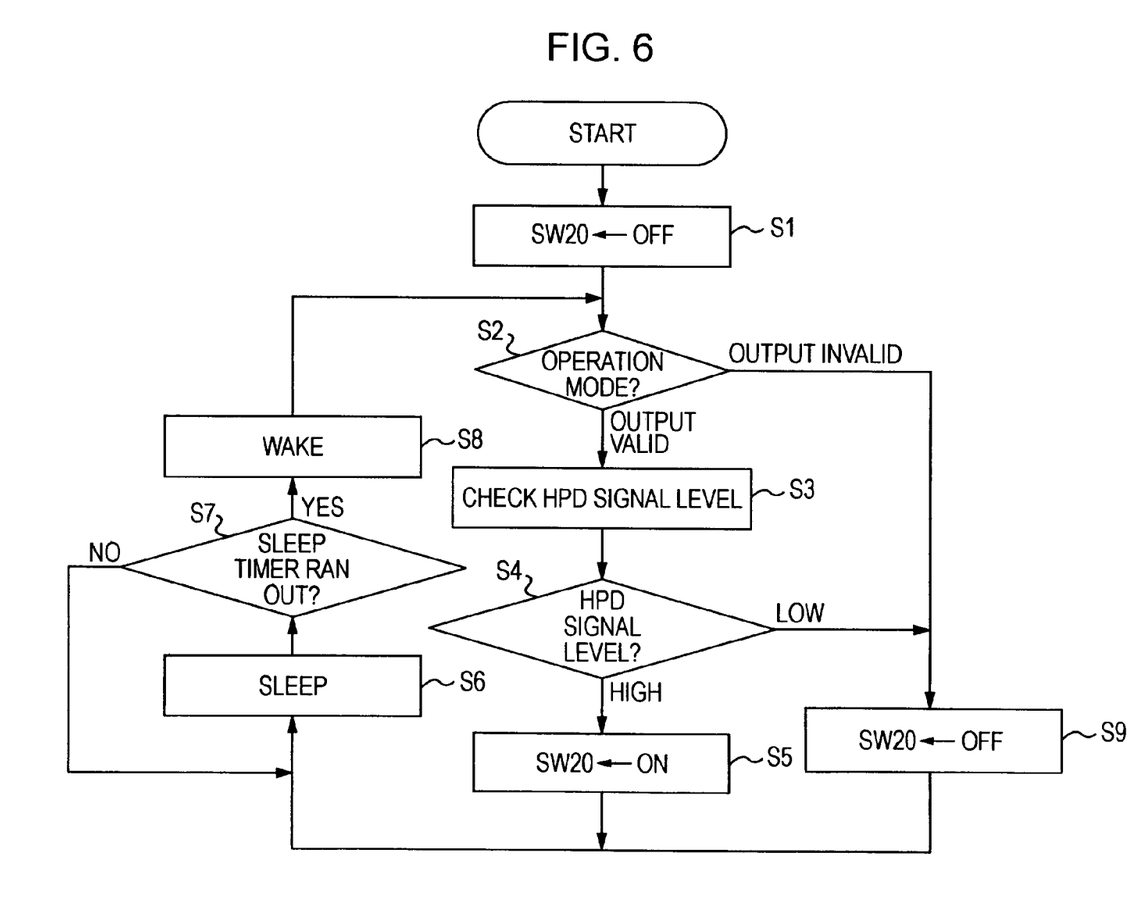
FIG. 6 is a flowchart illustrating a processing procedure executed by the CPU 21 within the HDMI source for realizing an operation such as shown in FIG. 5.

FIG. 6 illustrates processing procedure, which is executed by the CPU 21 within the HDMI source, for realizing an operation such as shown in FIG. 5 in a flowchart format.

When the power of the HDMI source is turned on, as an initial state, the CPU 21 turns off the switch SW20, and resets the HDMI control LSI (step S1).

Next, the CPU 21 confirms the current operation mode of the HDMI source itself. That is to say, in the event that the HDMI source is a camcorder, determination is made whether or not the current operation mode is an operation mode for outputting a video signal to the HDMI sink side via the HDMI control LSI 14, such as whether the play button has been pressed (step S2).

Now, when confirming an operation mode under which the output of a video signal to the HDMI sink side is invalid, the CPU 21 turns off the switch SW20 (step S9), resets the HDMI control LSI 14, thereby realizing reduction in power consumption.

On the other hand, when confirming an operation mode under which the output of a video signal to the HDMI sink side is valid, the CPU 21 detects the level of the HPD signal pin input to the CPU 21 itself (step S3).

When the HPD signal is a low level, this is a state in which a valid HDMI sink is not connected, for example, there is no choice other than that a video signal is output to the built-in liquid crystal display panel. That is to say, there is no need to output a video signal from the HDMI control LSI 14, so the CPU 21 turns off the switch SW20 (step S9), resets the HDMI control LSI 14, thereby realizing reduction in power consumption.

Also, when the HPD signal is a high level, this is a state in which a valid HDMI sink is connected, so there is a need to output a video signal from the HDMI control LSI 14 to the HDMI sink. Accordingly, the CPU 21 turns on the switch SW20 (step S5), and releases the reset state of the HDMI control LSI 14.

Subsequently, in a state in which there is no task to be processed, the CPU 21 continues its sleep state (step S6), and continues its sleep state until a sleep timer runs out (step S7).

Subsequently, when the sleep timer has run out, the CPU 21 makes the transition to a wake state (step S8), returns to step S2, and repeatedly performs the control of reset/reset-release of the HDMI control LSI according to the operation mode.

Figure 7:
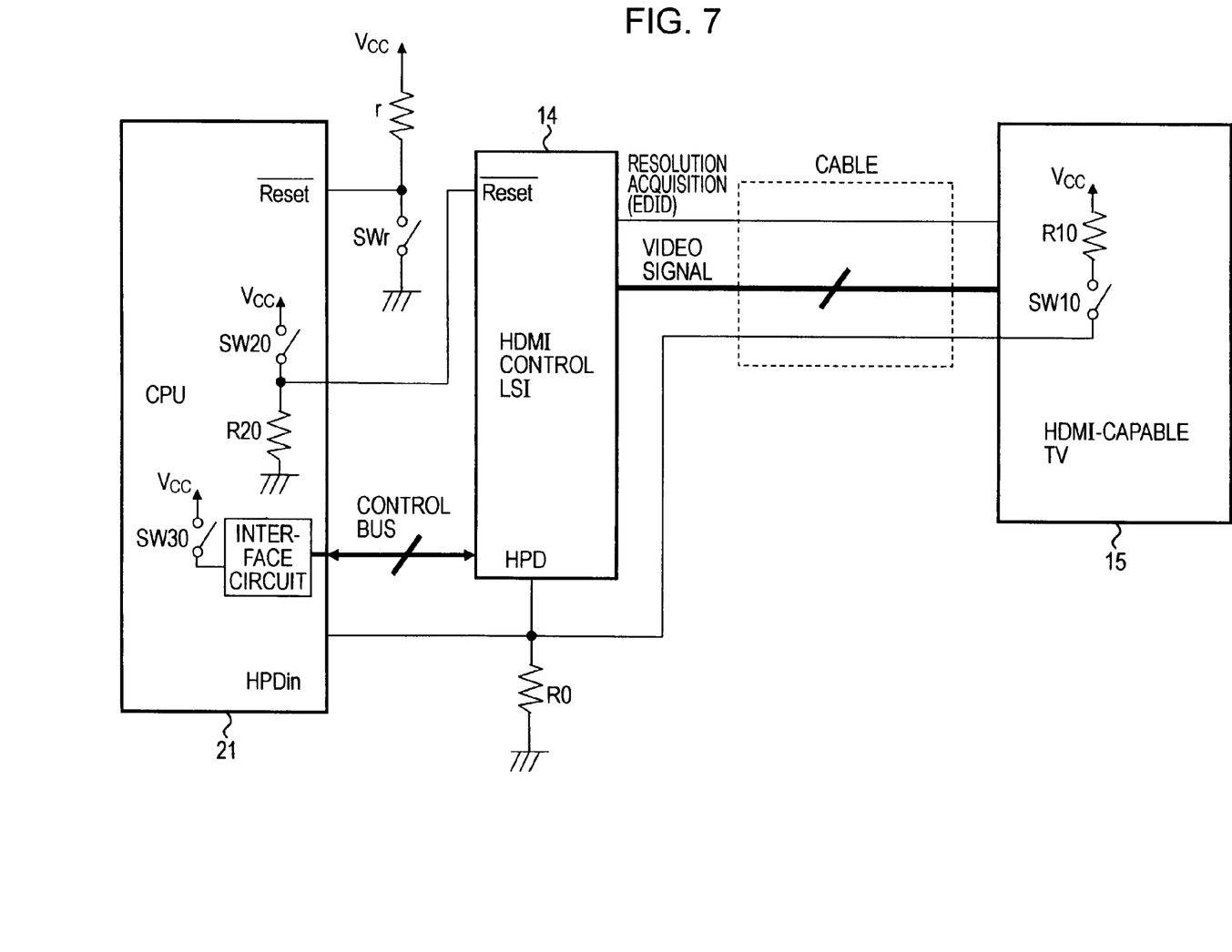
FIG. 7 is a diagram illustrating a modification of the HDMI source shown in FIG. 4.

FIG. 7 illustrates a modification example of the HDMI source shown in FIG. 4. While illustration is omitted in FIG. 4, the CPU 21 includes an internal interface circuit for mutually connecting to the HDMI control LSI. As for this type of interface circuit, in general, $I^2C$ (Inter-Integrated Circuit) or SIO (Serial Peripheral Interface) or the like is employed.

The CPU 21 directly inputs the HPD signal, whereby the validity of connection to the HDMI sink can be detected. When valid connection has not been confirmed, the CPU 21 turns off the switch SW20, stops the operation of the internal interface circuit, thereby realizing reduction in power consumption.

According to such an arrangement, the operation power consumption of the CPU 21 when a valid HDMI sink such as an HDMI-capable television monitor is not connected can be further reduced. Like with a camcorder, a television monitor is not connected in the event of taking a photograph outdoors, and accordingly, photography time can be lengthened more by turning off the power of an unemployed circuit block.

The terms "standard" and "specification" are defined as follows. In the Present Specification and Claims thereof, the term "standard" refers specifically to the HDMI Standard, more particularly, to any of HDMI Standard version 1.0 through 1.3 but not excluding future versions thereof. On the other hand, "specification" refers to a set of rules, values, and so forth, which may be conformant in part or in full to the HDMI Standard, and may be narrower or broader in scope than the HDMI Standard. The present invention encompasses the concept of both terms.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus to connect to an external device conforming with a predetermined interface specification, comprising:
    a control LSI coupled to a hot plug detection signal of the predetermined interface and configured to control a signal output to said external device and to operate in a reset state and a reset-released state in response to a reset control signal; and
    a CPU coupled to the hot plug detection signal and said control LSI and configured to control the operation of said information processing apparatus including said control LSI as a whole and to provide the reset control signal, said CPU including a means for detecting a state of the hot plug detection signal and a means for controlling the reset control signal based on the state of the hot plug detection signal.

2. The information processing apparatus according to claim 1, wherein
    said control LSI is further configured to read device information from said external device in response to the hot plug detection signal, and
    said CPU acquires the device information from said control LSI.

3. The information processing apparatus according to claim 2, wherein
    said predetermined interface specification is the HDMI (High Definition Multimedia Interface) standard.

4. The information processing apparatus according to claim 2, wherein
    said means for controlling further includes means for asserting the reset state of said control LSI in response to no valid external device being detected by said means for detecting and means for asserting the reset-released state of said control LSI in response to a valid external device being detected by said means for detecting.

5. The information processing apparatus according to claim 2, wherein said control LSI is further configured to operate in an output valid operation mode under which a signal is output to said external device during the reset-released state, and
    operate in an output invalid operation mode under which no signal is output to said external device during the reset state.

6. The information processing apparatus according to claim 1, wherein
    said CPU further includes an interface circuit to interface with said control LSI and is further configured to stop operation of the interface circuit during the reset state of said control LSI.

7. The information processing apparatus according to claim 2, wherein
    said CPU is further configured to operate intermittently between a wake state and a sleep state in which at least a part of circuit modules of said CPU are stopped.

8. An information processing apparatus to connect to an external device conforming with a predetermined interface specification, comprising:
    a control LSI coupled to a hot plug detection signal of the predetermined interface and configured to control a signal output to said external device and to operate in a reset state and a reset-released state in response to a reset control signal; and
    a CPU coupled to the hot plug detection signal and said control LSI and configured to control the operation of said information processing apparatus including said control LSI as a whole and to provide the reset control signal, said CPU including a detection circuit to detect a state of the hot plug detection signal and a control circuit to control the reset control signal based on the state of the hot plug detection signal.

9. The information processing apparatus according to claim 1, wherein
    said CPU is further configured to operate intermittently between a wake state and a sleep state, and
    said control LSI is further configured to read device information from said external device in response to the hot plug detection signal during the reset-released state of said control LSI and the sleep state of the CPU.

* * * * *